United States Patent [19]

Kubota et al.

[11] Patent Number: 5,186,763
[45] Date of Patent: Feb. 16, 1993

[54] PROCESS FOR PRODUCTION OF NON-ORIENTED ELECTRICAL STEEL SHEET HAVING EXCELLENT MAGNETIC PROPERTIES

[75] Inventors: Takeshi Kubota, Kitakyushu; Tadashi Nakayama, Futtsu, both of Japan

[73] Assignee: Nippon Steel Corporation, Tokyo, Japan

[21] Appl. No.: 872,087

[22] Filed: Apr. 22, 1992

[30] Foreign Application Priority Data

Apr. 25, 1991 [JP] Japan ..................... 3-95375

[51] Int. Cl.$^5$ ............................. H01F 1/04
[52] U.S. Cl. ..................... 148/111; 148/120
[58] Field of Search ................. 148/111, 120

[56] References Cited

U.S. PATENT DOCUMENTS

| | | | |
|---|---|---|---|
| 3,971,678 | 7/1976 | Vlad | 148/111 |
| 5,082,510 | 1/1992 | Nishimoto et al. | 148/111 |
| 5,102,478 | 4/1992 | Hosoya et al. | 148/111 |
| 5,108,521 | 4/1992 | Hosoya et al. | 148/111 |
| 5,116,435 | 5/1992 | Nishimoto et al. | 148/111 |

FOREIGN PATENT DOCUMENTS

| | | |
|---|---|---|
| 0084980 | 8/1983 | European Pat. Off. |
| 0423331 | 4/1991 | European Pat. Off. |
| 51-942 | 1/1976 | Japan |
| 58-151453 | 9/1983 | Japan |
| 59-157259 | 9/1984 | Japan |
| 61-067753 | 4/1986 | Japan |
| 62-180014 | 8/1987 | Japan |

OTHER PUBLICATIONS

Patent Abstracts of Japan, vol. 16, No. 128, (C-924), Apr., 1992.

*Primary Examiner*—John P. Sheehan
*Attorney, Agent, or Firm*—Kenyon & Kenyon

[57] ABSTRACT

The present invention relates generally to a non-oriented electrical steel sheet usable as a metallic material for cores incorporated in an electrical apparatus, an electrical equipment or the like and the non-oriented electrical steel sheet is produced, by which a steel slab having a composition comprising Si: 0.1% or more but less than 1.5%, Al: 0.3% or more to 2.0% or less and Si+2Al: 2.0% or more is hot rolled; the hot-rolled steel plate is annealed at a temperature ranging from 1000° to 1200° C.; the annealed hot-rolled steel sheet is cold rolled at a reduction ratio ranging from 85 to 95%, and subsequently, the cold-rolled steel sheet is subjected to finish annealing under conditions of a temperature ranging from 750° to 1000° C. and a time longer than 15 seconds but shorter than 2 minutes.

1 Claim, No Drawings

PROCESS FOR PRODUCTION OF NON-ORIENTED ELECTRICAL STEEL SHEET HAVING EXCELLENT MAGNETIC PROPERTIES

BACKGROUND OF THE INVENTION

1. Field of the Invention

The present invention relates generally to a process for the production of a non-oriented electrical steel sheet having excellent magnetic properties usable as a core material in an electrical apparatus or equipment. More particularly, the present invention relates to a process for the production of a non-oriented electrical steel sheet having very excellent magnetic properties while exhibiting a remarkably small difference between the magnetic properties of the steel sheet as measured on a plane coincident with the steel sheet in the rolling direction (hereinafter referred to simply as a L direction) and the magnetic properties of the same as measured on the plane coincident with the steel sheet in the direction at a right angle relative to the rolling direction (hereinafter referred to simply as a C direction).

2. Description of the Prior Art

In recent years, many earnest requests for operating an electrical apparatus, electrical equipment or the like at a higher efficiency have been received because of the current worldwide demand to reduce consumption of electricity and energy, and preserve the world environment. In this connection, many requests to improve the magnetic properties of a non-oriented electrical steel sheet widely used as a metallic material for cores incorporated in a large-sized electrical rotary machine, a medium or small-sized transformer or the like have been received from users.

Generally, a method of reducing the watt loss of a non-oriented electrical steel sheet by increasing the content of silicon or aluminum has been hitherto widely employed as a means for improving the magnetic properties of a conventional non-oriented electrical steel sheet from the viewpoint of reducing eddy current loss induced by an increase in electric resistance. However, it has been found that watt loss can practically be reduced but the most significant problem concerning the reduction of the magnetic flux density of the non-oriented electrical steel sheet cannot be resolved by the method as mentioned above. In view of the foregoing circumstances, treatments for reducing the content of carbon, reducing the content of sulfur or adding boron to the steel sheet as disclosed in an official gazette of Japanese Unexamined Publication Patent (Kokai) NO. 54-163720 were employed in addition to a treatment for increasing the content of silicon or aluminum. In spite of the treatments employed in the above-described manner, reduction of watt loss was practically achieved but remarkable effects were not recognized with respect to the magnetic flux density of the non-oriented electrical steel sheet.

As disclosed in official gazettes of, e.g., Japanese Unexamined Publication Patent (Kokai) NO. 58-151453, Japanese Unexamined Publication Patent (Kokai) NO. 59-157259, Japanese Unexamined Publication Patent (Kokai) NO. 61-067753 and Japanese Unexamined Publication Patent (Kokai) NO. 62-180014, a method of improving the magnetic properties of a non-oriented electrical steel sheet by a combination made among the addition of an element of tin, copper or the like by a small quantity and production process conditions have been proposed based on the viewpoint that watt loss and magnetic flux density can simultaneously be improved by developing the texture of the electrical steel sheet to assume a magnetically desirable shape. With the proposed method, however, development of a (111) texture undesirable for the magnetic nature of the non-oriented electrical sheet was actually suppressed but growth of a (100) texture hitherto considered most desirable for the magnetic nature of the non-oriented has not been achieved. Unexpectedly, there appears a problem in that a (110) texture hitherto considered desirable for the magnetic nature of an oriented electrical steel sheet is liable to develop.

On the other hand, a method of producing a non-oriented electrical steel sheet by intensely cold rolling a hot-rolled steel sheet at a high reduction ratio of 85% or more, preferably 90% or more and then annealing the cold-rolled steel sheet under a temperature ranging from 700° C. to 1200° C. and a time ranging from 2 minutes to one hour as disclosed in an official gazette of Japanese Examined Publication Patent (Kokoku) NO. 51-942 has been hitherto employed as means for developing a (100) texture desirable for the magnetic nature of the non-oriented electrical steel sheet. However, since this method requires annealing the cold-rolled steel sheet for a long period of time in addition to intensely cold rolling the hot-rolled steel sheet, employment of the method was very disadvantageous from the viewpoint of practical use of the method because of the problems associated with reduction of productivity, elevation of production cost and installation of an expensive production line.

The present invention has been made with the foregoing in mind and its subject resides in providing a method of producing a non-oriented electrical steel sheet having excellent magnetic properties in a simple manner wherein a difference between the magnetic properties of the electrical steel sheet in the L direction and the magnetic properties of the same in the C direction can be significatly reduced by developing a (100) texture desirable for the magnetic nature of the electrical steel sheet.

SUMMARY OF THE INVENTION

The inventors have elaborately conducted a variety of research work on the possibility that a non-oriented electrical steel sheet having very excellent properties while exhibiting a very small difference between the magnetic properties of the electrical steel sheet in the L direction and the magnetic properties of the same in the C direction could be obtained by a proper combination made prior to a cold rolling operation and conditions for recrystallization annealing after the cold rolling operation while the texture of the electrical steel sheet was developed to assume a (100) texture desirous for the magnetic nature of the electrical steel sheet.

As a result of the research work, the inventors succeeded in obtaining a non-oriented electrical steel sheet having excellent absolute values representing the magnetic properties of the electrical steel sheet while exhibiting a remarkably reduced difference between the properties of the electrical steel sheet in the L direction and the properties of the same in the C direction by properly controlling a crystalline structure of a raw material prior to a cold rolling operation, i.e., a crystalline structure of a hot-rolled steel sheet with a proper combination made among a content of each component in the steel sheet, especially, a content of silicon and aluminum and conditions associated wit annealing the hot-rolled steel sheet, and subsequently, combining a cold rolling operation with a short recrystallization annealing operation after completion of the cold rolling operation.

The present invention has been made based on the foregoing knowledge. Specifically, a characterizing feature of the present invention consists of a method of producing a non-oriented electrical steel sheet having excellent magnetic properties wherein a steel slab having a composition comprising up to 0.01% by weight of C, 0.1 to less than 1.5% by weight of Si, 0.3 to 2.0% by weight of Al, 2.0% or more by weight of Si +2Al and a balance of Fe and unavoidable impurities are hot rolled, thereafter, the hot-rolled steel sheet is annealed, the annealed steel sheet is then cold rolled once to assume a final thickness, and subsequently, the cold-rolled steel sheet is subjected to finish annealing, wherein the method is characterized in that the annealing of the hot-rolled steel sheet is accomplished under a temperature of 1000° to 1200° C. and a time of 30 seconds to 5 minutes, the cold rolling of the hot-rolled steel sheet is accomplished at a reduction ratio of 85 to 95%, and the finish annealing is accomplished under a temperature of 750° to 1000° C. and a time of 15 seconds to 2 minutes.

DESCRIPTION OF THE PREFERRED EMBODIMENTS

First, the reason why the content of each component in a steel slab has been defined in the above-noted manner will be described below.

Carbon is a harmful component that functions not only to elevate watt loss but also to induce magnetic aging. For this reason, the content of carbon is defined to be up to 0.010%.

As is well known for any expert in the art, a silicon is a component that functions to reduce watt loss. To assure that the foregoing function is exhibited without fail, it is necessary that the silicon is contained in the steel slab by a quantity of 0.1% or more. On the contrary, as the content of silicon is increased, the magnetic flux density of a product of a non-oriented electrical steel sheet is undesirably reduced as mentioned above. For this reason, the content of silicon is defined to be less than 1.5%.

Aluminum functions to elevate electrical resistance and reduce watt loss of the steel sheet in the same manner as the element of silicon. In addition, the aluminum functions to vary the crystalline structure of the hot-rolled steel sheet during an annealing operation under the multiplicative effect derived from cooperation with the silicon to thereby reduce the difference of the magnetic properties of the steel sheet in the L direction and the magnetic properties of the same in the C direction. To assure that the foregoing function is exhibited without fail, it is necessary that the aluminum be contained in the steel slab by a quantity of 0.3% or more and the Si +2Al be contained in the steel slab by a quantity of 2.0% or more. On the other hand, as the content of aluminum is increased, the magnetic flux density of the steel sheet is undesirably reduced in the same manner as mentioned above. For this reason, the content of aluminum is defined to be up to 2.0%.

Iron and elements identified by unavoidable impurities can be noted as elements other than the afore-mentioned elements. As desired, Manganese may be added to the steel slab for elevating the electrical resistance and reducing watt loss of the steel sheet. In this case, it is required that the manganese be added to the steel slab by a quantity of 0.1% or more. On the contrary, when the content of manganese exceeds 1.5%, the magnetic flux density of the steel sheet is reduced. For this reason, it is desirable that the content of manganese be defined to be up to 1.5%.

Next, a relationship between the magnetic properties of the steel sheet and a characterizing feature of the present invention, i.e., a combination made among conditions for annealing the hot-rolled sheet, a reduction ratio employable for the cold rolling operation and conditions for the finish annealing will be described below.

A steel slab having a composition as shown in Table 1 was hot rolled to have a thickness of 4.0 mm, and thereafter, the hot-rolled steel sheet was subjected to three kinds of treatments as shown in Table 2, i.e., hot-rolled steel sheet annealing, cold rolling and finish annealing. Subsequently, the cold-rolled steel sheet was cut into pieces each serving as an Epstein testpiece, and these testpieces were used for measuring the magnetic properties of non-oriented electrical steel sheet. The results derived from the measurements are shown in Table 3. As is apparent from Table 3, a non-oriented electrical steel sheet having a remarkably small difference between the magnetic flux density $B_{50}$ of the steel sheet in the L direction and the magnetic flux density $B_{50}$ in the C direction could be obtained dependent on a combination made among conditions for annealing the hot-rolled steel sheet, a reduction ratio employable for the cold rolling operation and conditions for the finish annealing of the cold-rolled steel sheet. Especially, in the case where a content of each of silicon and aluminum satisfactorily remained within the range defined by the conditions constituting the present invention, as is recognizable in the testpieces of NO. 8 and NO. 11; the hot-rolled steel sheet was annealed at a temperature of 1100° C. for 2 minutes, the hot-rolled steel sheet was cold rolled at a reduction ratio of 90.0% and the cold-rolled steel sheet was subjected to finish annealing at a temperature of 850° C. for 30 seconds, it was found that a difference between the magnetic flux density $B_{50}$ of the steel sheet in the L direction and the magnetic flux density $B_{50}$ of the same in the C direction was significantly reduced with the testpieces as mentioned above and that a non-oriented electrical steel sheet having very excellent magnetic properties while exhibiting high absolute values coluld be obtained by employing the method of the present invention.

TABLE 1

| steel NO. | C | Si | Al | Mn | S | N |
|---|---|---|---|---|---|---|
| | | | | | (percentage by weight) | |
| A | 0.002 | 0.3 | — | 0.3 | 0.003 | 0.002 |
| B | 0.002 | 0.3 | 0.6 | 0.3 | 0.003 | 0.002 |
| C | 0.002 | 0.3 | 1.0 | 0.3 | 0.003 | 0.002 |
| D | 0.002 | 0.3 | 1.0 | 0.6 | 0.003 | 0.002 |

TABLE 2

| NO. | steel NO. | annealing for hot-rolled steel sheet | reduction ratio for cold rolling | finish annealing |
|---|---|---|---|---|
| 1 | A | 1100° C. × 2 minutes | 90.0% | 850° C. × 30 seconds |
| 2 | B | 1100° C. × 2 minutes | 90.0% | 850° C. × 30 seconds |
| 3 | C | 900° C. × 2 minutes | 82.5% | 850° C. × 30 seconds |
| 4 | C | 900° C. × 2 minutes | 90.0% | 850° C. × 30 seconds |

TABLE 2-continued

| NO. | steel NO. | annealing for hot-rolled steel sheet | reduction ratio for cold rolling | finish annealing |
|---|---|---|---|---|
| 5 | C | 900° C. × 2 minutes | 96.3% | 850° C. × 30 seconds |
| 6 | C | 1100° C. × 2 minutes | 82.5% | 850° C. × 30 seconds |
| 7 | C | 1100° C. × 2 minutes | 90.0% | 700° C. × 30 seconds |
| 8 | C | 1100° C. × 2 minutes | 90.0% | 850° C. × 30 seconds |
| 9 | C | 1100° C. × 2 minutes | 90.0% | 1050° C. × 30 seconds |
| 10 | C | 1100° C. × 2 minutes | 96.3% | 850° C. × 30 seconds |
| 11 | D | 1100° C. × 2 minutes | 90.0% | 850° C. × 30 seconds |

TABLE 3

| NO. | $B_{50}$ (Telsa) L | $B_{50}$ (Telsa) C | $B_{50}(L)/B_{50}(C)$ |
|---|---|---|---|
| 1 | 1.76 | 1.74 | 1.01 |
| 2 | 1.77 | 1.75 | 1.01 |
| 3 | 1.82 | 1.75 | 1.04 |
| 4 | 1.77 | 1.74 | 1.02 |
| 5 | 1.75 | 1.73 | 1.01 |
| 6 | 1.84 | 1.73 | 1.06 |
| 7 | 1.79 | 1.77 | 1.01 |
| 8 | 1.82 | 1.80 | 1.01 |
| 9 | 1.78 | 1.76 | 1.01 |
| 10 | 1.77 | 1.75 | 1.01 |
| 11 | 1.81 | 1.79 | 1.01 |

As is apparent from the above description, a characterizing feature of the present invention consists of a non-oriented electrical steel sheet having excellent magnetic properties while exhibiting a very small difference between the magnetic properties of the steel sheet in the L direction and the magnetic properties of the same in the C direction is produced using a steel slab having a content of silicon and aluminum remaining within the scope defined by the aforementioned conditions under a proper combination made among conditions for annealing the hot-rolled steel sheet, a reduction ratio employable for the cold rolling and conditions for the finish annealing. In this connection, it should be noted that an annealing for the hot-rolled steel sheet was performed under a temperature of 1000° to 1200° C. and a time of 30 seconds to 5 minutes. When the annealing temperature employable for the hot-rolled steel sheet was lower than 1000° C., the magnetic properties of the steel sheet in the L direction and the magnetic properties of the same in the C direction did not improve, and the difference between the magnetic properties of the steel sheet in the L direction and the magnetic properties of the same in the C direction could be reduced only with difficulty. In addition, when the annealing temperature employable for the hot-rolled steel sheet exceeded 1200° C., the effect derived from the annealing was saturated, and moreover, reduction of productivity and elevation of production cost were recognized. For this reason, the annealing temperature for the hot-rolled steel sheet was set to be lower than 1200° C. When the annealing temperature employable for the hot-rolled steel sheet was shorter than 30 seconds, the magnetic properties of the steel sheet in the L direction and the magnetic properties of the same in the C direction did not improve. On the contrary, when the annealing temperature for the hot-rolled steel sheet exceeded 5 minutes, the effect derived from the annealing was saturated, and moreover, reduction of productivity and elevation of production cost were recognized. For this reason, the annealing temperature for the hot-rolled steel sheet was set to be longer than 30 seconds but shorter than 5 minutes.

When the reduction ratio employable for the cold rolling operation was less than 85%, the difference between the magnetic properties of the steel sheet in the L direction and the magnetic properties of the same in the C direction could not be reduced. On the contrary, when the reduction ratio employable for a cold rolling operation exceeded 95%, the magnetic flux density of the steel sheet not only in the L direction but also in the C direction was degraded.

The finish annealing operation was performed under a temperature of 750° to 1000° C. and a time of 15 seconds to shorter than 2 minutes. When the temperature employable for the finish annealing operation was lower than 750° C., the magnetic properties of the steel sheet in the L direction and the magnetic properties of the same in the C direction did not improve. In addition, when the temperature for the finish annealing operation exceeded 1000° C., the magnetic flux density of the steel sheet in the L direction and also in the C direction was reduced. When the time employable for the finish annealing operation was shorter than 15 seconds, the growth of crystal grains after completion of recrystallization was unacceptable, and moreover, the watt loss of the steel sheet deteriorated. On the contrary, when the time employable for the finish annealing operation was 2 minutes or more, the effect derived from the finish annealing operation was saturated, and moreover, reduction of productivity and elevation of production cost were recognized. For this reason, the time employable for the finish annealing temperature was set to be 15 seconds to shorter than 2 minutes.

It should be noted that the steel slab having a chemical composition required for carrying out the present invention was prepared by way of steps of melting raw materials in a converter or an electric furnace and then continuously casting a molten steel or blooming an ingot produced by normal casting, the steel slab was then hot rolled, and subsequently, the hot-rolled steel sheet was annealed in the above-described manner.

The present invention will now be described in detail with reference to the following examples, that by no means limit the scope of the invention.

EXAMPLE 1

A steel slab having a composition as shown in Table 4 was hot rolled to assume a thickness of 2.8 mm, thereafter, the hot-rolled steel sheet was annealed under conditions as shown in Table 5, the hot-rolled steel sheet was then cold rolled to assume a thickness of 0.35 mm (at a reduction ratio of 87.5%), and subsequently, the cold-rolled steel sheet was subjected to finish annealing under conditions as shown in Table 5. The resultant cold-rolled steel sheet was cut into pieces each serving as an Epstein testpiece, and the magnetic properties of the steel sheet were measured with each Epstein testpiece. The results derived from the measurements are shown in Table 6. As is apparent from this table, a non-oriented electrical steel sheet having excellent magnetic properties while exhibiting a remarkably small difference between the magnetic properties of the steel sheet in the L direction and the magnetic properties of the same in the C direction could be produced by employing the method in accordance with the first embodiment of the present invention.

TABLE 4

| steel NO. | C | Si | Al | Mn | S | N |
|---|---|---|---|---|---|---|
| | | | | | (percentage by weight) | |
| E | 0.003 | 0.1 | 1.0 | 0.2 | 0.002 | 0.002 |

TABLE 5

| NO. | conditions for annealing of hot-rolled steel sheet | condition for finish annealing | remark |
|---|---|---|---|
| 21 | 900° C. × 2 minutes | 900° C. × 30 seconds | comparative example |
| 22 | 1050° C. × 2 minutes | 700° C. × 30 seconds | comparative example |
| 23 | 1050° C. × 2 minutes | 900° C. × 30 seconds | present invention |
| 24 | 1050° C. × 2 minutes | 1050° C. × 30 seconds | comparative example |

TABLE 6

| NO. | $B_{50}$ (Tesla) | | $W_{15/50}$ (w/kg) | |
|---|---|---|---|---|
| | L | C | L | C |
| 21 | 1.78 | 1.74 | 3.71 | 4.13 |
| 22 | 1.79 | 1.77 | 4.69 | 4.95 |
| 23 | 1.83 | 1.81 | 3.63 | 3.82 |
| 24 | 1.78 | 1.76 | 3.60 | 3.78 |

EXAMPLE 2

Steel slabs each having a composition as shown in Table 7 were hot rolled to assume thicknesses of 1.2 mm, 2.0 mm and 5.0 mm, respectively. Thereafter, the hot-rolled steel sheets were annealed under a temperature of 1120° C. and a time of 2 minutes, and subsequently, the annealed steel sheets were cold rolled once to assume a thickness of 0.20 mm. Then, the cold-rolled steel sheets were subjected to finish annealing under conditions as shown in Table 8, and the annealed steel sheets were cut into pieces each serving as an Epstein testpiece. The magnetic properties of each steel sheet were measured with each Epstein testpiece. The results derived from the measurements are shown in Table 9. As is apparent from the drawing, a non-oriented electrical steel sheet having excellent magnetic properties while exhibiting a remarkably small difference between the magnetic properties of each steel sheet in the L direction and the properties of the same in the C direction could be obtained by employing the method in accordance with the second embodiment of the present invention.

TABLE 7

| steel NO. | C | Si | Al | Mn | S | N |
|---|---|---|---|---|---|---|
| | | | | | (percentage by weight) | |
| F | 0.003 | 0.6 | 0.8 | 0.5 | 0.003 | 0.002 |

TABLE 8

| NO. | reduction ratio for cold rolling | condition for finish annealing | remark |
|---|---|---|---|
| 31 | 83.3% | 950° C. × 20 seconds | comparative example |
| 32 | 90.0 | 700° C. × 20 seconds | comparative example |
| 33 | 90.0% | 950° C. × 20 seconds | present invention |
| 34 | 90.0 | 1050° C. × 20 seconds | comparative example |
| 35 | 96.0% | 950° C. × 20 seconds | comparative example |

TABLE 9

| NO. | $B_{50}$ (Tesla) | | $W_{15/50}$ (w/kg) | |
|---|---|---|---|---|
| | L | C | L | C |
| 31 | 1.83 | 1.74 | 2.71 | 3.18 |
| 32 | 1.78 | 1.76 | 4.58 | 4.81 |
| 33 | 1.82 | 1.80 | 2.73 | 2.91 |
| 34 | 1.77 | 1.75 | 2.69 | 2.85 |
| 35 | 1.76 | 1.74 | 2.77 | 2.92 |

As described above, according to the present invention, a non-oriented electrical steel sheet having excellent magnetic properties while exhibiting a remarkably small difference between the magnetic properties of the steel sheet in the L direction and the magnetic properties of the same in the C direction can be obtained. Thus, since the method of the present invention can satisfactorily meet the requirements for a non-oriented electrical steel sheet usable as a metallic material for cores incorporated in an electrical apparatus, electrical equipment or the like adapted to operate at a higher efficiency, the method of the present invention offers many advantageous industrial effects.

We claim:

1. A process for the preparation of a non-oriented electrical steel sheet having excellent magnetic properties wherein a steel slab comprising up to 0.010% by weight of C, 0.1 to less than 1.5% by weight of Si, 0.3 to 2.0% by weight of Al, 2.0% or more by weight of Si +2Al and the balance Fe and unavoidable impurities is hot rolled and a hot rolled steel sheet is formed, thereafter; the hot rolled steel sheet is annealed, the annealed hot rolled steel sheet is then cold rolled in a single stage to assume a final thickness and a cold rolled steel sheet is formed, and subsequently, the cold rolled steel sheet is subjected to finish annealing, said annealing of the hot rolled steel sheet is at a temperature of 1000° to 1200° C. and for time of 30 seconds to 5 minutes; said cold rolling of the hot rolled steel sheet is at a reduction ratio of 85 to 95%, and said finish annealing is at under a temperature of 750° to 1000° C. and for a time of 15 seconds to 2 minutes.

* * * * *

UNITED STATES PATENT AND TRADEMARK OFFICE
CERTIFICATE OF CORRECTION

PATENT NO. : 5,186,763
DATED : February 16, 1993
INVENTOR(S) : Takeshi KUBOTA, et al.

It is certified that error appears in the above-identified patent and that said Letters Patent is hereby corrected as shown below:

Column 2, line 55, change "desirous" to --desirable--.

Column 3, line 1, change "wit" to --with--.

Column 4, line 57, in Table 1, row D, under "Si" should be --1.0--, not "0.3"; under Al should be --0.6-- not "1.0"; and under "Mn" should be --0.3-- not "0.6".

Column 5, line 32, change "consists" to --consisting--.

Column 8, line 55, between "finish annealing" and "said", insert --wherein--.

Column 8, line 59, delete "under".

Signed and Sealed this

Fifteenth Day of March, 1994

Attest:

BRUCE LEHMAN

Attesting Officer     Commissioner of Patents and Trademarks